(12) United States Patent
Wei

(10) Patent No.: US 10,606,999 B2
(45) Date of Patent: Mar. 31, 2020

(54) KEYWORD VERIFICATION METHOD AND DEVICE FOR IMPLEMENTING SAME

(71) Applicant: Jianfeng Wei, Sichuan (CN)

(72) Inventor: Jianfeng Wei, Sichuan (CN)

(*) Notice: Subject to any disclaimer, the term of this patent is extended or adjusted under 35 U.S.C. 154(b) by 0 days.

(21) Appl. No.: 16/238,501

(22) Filed: Jan. 2, 2019

(65) Prior Publication Data

US 2019/0138709 A1    May 9, 2019

Related U.S. Application Data

(63) Continuation of application No. PCT/CN2017/091392, filed on Jul. 2, 2017.

(30) Foreign Application Priority Data

Jul. 3, 2016    (CN) .......................... 2016 1 0511160

(51) Int. Cl.
*G06F 21/00* (2013.01)
*G06F 21/36* (2013.01)
*H04L 9/32* (2006.01)
*G06Q 30/02* (2012.01)

(52) U.S. Cl.
CPC ......... *G06F 21/36* (2013.01); *G06Q 30/0251* (2013.01); *H04L 9/32* (2013.01)

(58) Field of Classification Search
None
See application file for complete search history.

(56) References Cited

U.S. PATENT DOCUMENTS

| | | | |
|---|---|---|---|
| 8,108,528 B2* | 1/2012 | Jones | G06Q 10/107 709/204 |
| 2002/0184540 A1* | 12/2002 | Tan | B60K 35/00 713/300 |
| 2013/0031640 A1* | 1/2013 | Fisk | G06F 21/36 726/28 |
| 2013/0036108 A1* | 2/2013 | Corbeau | G06F 16/958 707/722 |
| 2014/0096196 A1* | 4/2014 | O'Connor | G06F 21/36 726/4 |
| 2014/0101744 A1* | 4/2014 | Liu | H04L 9/3228 726/7 |
| 2014/0150085 A1* | 5/2014 | Furuichi | G06F 21/36 726/17 |

(Continued)

FOREIGN PATENT DOCUMENTS

| | | |
|---|---|---|
| CN | 102594806 A | 7/2012 |
| CN | 102841996 A | 12/2012 |

(Continued)

*Primary Examiner* — Maung T Lwin
(74) *Attorney, Agent, or Firm* — Wayne & Ken, LLC; Tony Hom

(57) ABSTRACT

Provided is a keyword verification method including: acquiring keywords corresponding to the content of a verification object, such as a video, an audio and a picture, displayed and broadcast by a client; and using an identifier to mark the content, generating a verification prompt according to the keyword or the identifier, and further determining a verification result according to a feedback of a user of a corresponding client. Further disclosed is a generation device for implementing the verification method.

10 Claims, 15 Drawing Sheets

(56) References Cited

U.S. PATENT DOCUMENTS

2015/0081440 A1* 3/2015 Blemaster ............. G06F 16/951
  705/14.54
2016/0004856 A1* 1/2016 Wang ....................... G06F 21/36
  726/7
2016/0028741 A1* 1/2016 Zhang ..................... G06F 21/36
  726/5

FOREIGN PATENT DOCUMENTS

| CN | 103139204 A | 6/2013 |
| CN | 103971045 A | 8/2014 |
| CN | 105681246 A | 6/2016 |
| CN | 105978905 A | 9/2016 |
| CN | 106209810 A | 12/2016 |
| WO | 2009121437 A1 | 10/2009 |

* cited by examiner providing the object storage unit; acquiring the verification object from a local or network storage server or through directly uploading ; setting an identifier coordinate corresponding to the content of the verification object according to the keywords corresponding to the contents of the verification object; binding and storing the verification object, the keyword and the identifier coordinates in the object storage unit — S310

FIG. 2

```
┌─────────────────────────────────────────────────────────────────────────┐
│ Control step. The control step used to constitute a new verification    │
│ object by combining a keyword object; wherein the keyword object is a   │
│ video, an audio, an animation, a character, a text, a dynamic picture,  │
│ a static picture or a combination thereof; the identifier coordinates   │
│ of the keyword object are set according to the keyword; the keyword     │
│ object, the keyword and the identifier coordinates of the keyword       │
│ object are bound, and then stored in the object storage unit; the       │
│ keyword object can be extracted from the object storage unit, then      │
│ transmitted to the client; the keyword object is played and displayed   │
│ on a surface or an adjacent location of the verification object or      │
│ played as a background of the verification object, so that the new       ├── S710
│ verification object is constituted by combining the verification        │
│ object and the keyword object; a keyword corresponding to the new       │
│ verification object and identifier coordinates of the new verification  │
│ object are determined by the keyword bound by the keyword object and    │
│ the identifier coordinates of the keyword object; alternatively, the    │
│ keyword object is directly generated according to the keyword           │
│ corresponding to the content of the verification object and displayed   │
│ and played on the client; alternatively, the keyword object is directly │
│ generated according to the keyword corresponding to the content of the  │
│ verification object and played and displayed on the surface or the      │
│ adjacent location of the verification object or played as the           │
│ background of the verification object.                                  │
└─────────────────────────────────────────────────────────────────────────┘
                                    ↕
┌─────────────────────────────────────────────────────────────────────────┐
│ acquiring keywords corresponding to contents of a verification object   │
│ displayed and played on a client; wherein the verification objects are   ├── S720
│ video, audio, animation, characters, text, dynamic pictures, static     │
│ pictures, or combinations thereof                                       │
└─────────────────────────────────────────────────────────────────────────┘
                                    ↓
┌─────────────────────────────────────────────────────────────────────────┐
│ marking the content with an identifier; further generating a            │
│ verification prompt according to the keyword or the identifier;          ├── S730
│ wherein the identifier is a letter, a number, a symbol or a picture    │
└─────────────────────────────────────────────────────────────────────────┘
                                    ↓
┌─────────────────────────────────────────────────────────────────────────┐
│ receiving a second request for requesting a verification from the       │
│ client; wherein the second request carries a second verification code    ├── S740
│ filled in or selected from selection items by the client according to   │
│ the verification prompt                                                 │
└─────────────────────────────────────────────────────────────────────────┘
                                    ↓
┌─────────────────────────────────────────────────────────────────────────┐
│ acquiring a first verification code associated with the keyword, the     ├── S750
│ identifier and the verification prompt according to the second request  │
└─────────────────────────────────────────────────────────────────────────┘
                                    ↓
┌─────────────────────────────────────────────────────────────────────────┐
│ determining a verification result according to the first verification    ├── S760
│ code and the second verification code                                   │
└─────────────────────────────────────────────────────────────────────────┘
```

FIG. 6

KEYWORD VERIFICATION METHOD AND DEVICE FOR IMPLEMENTING SAME

CROSS-REFERENCE TO RELATED APPLICATIONS

This application is a continuation of International Application No. PCT/CN2017/091392, filed on Jul. 2, 2017, which claims priority from Chinese Patent Application No. 201610511160.1, filed on Jul. 3, 2016, both of which are hereby incorporated by reference in their entireties.

TECHNICAL FIELD

The present application relates to communications and networks, and in particular to a verification method and a device for implementing same.

BACKGROUND

At present, most websites or forums require users to enter a verification code when registering, logging in, posting, replying, downloading a file and purchasing goods or services. Verification codes are mainly used to identify whether they are real user behaviors or malicious behaviors. Most of the existing verification code technologies randomly generate numbers or letters and display them to users in the form of pictures. In order to increase the difficulty of machine cracking, the interference bars (codes), distorted and curved picture elements and various nesting algorithms and so on are used in the verification code picture. These methods, to a certain extent, increase the difficulty of customer's recognition, and are easy to arouse an averse mentality of users.

On the one hand, some advertisers utilize the verification codes frequently displayed to advertise by means of many new methods. However, the effect of advertising by adding the verification codes into the advertisements is not good in reality. On the other hand, nesting random codes as verification codes in advertisements not only undermines the overall effects of the advertisements, but also makes the content of the advertisements easy to be ignored by users.

Therefore, a suitable verification method is needed. The suitable verification method will not only be difficult to crack technically but also satisfy various aspects demands of publicity by combining the advertisements, thereby increasing the social benefits.

SUMMARY

The disclosure provides a keyword verification method and a device thereof, which makes the verification process difficult to be recognized by a computer program, and can be applied to social needs such as advertisement publishing.

devicea device for implementing verification method

A keyword verification method includes:

receiving, by a server computer system, a first request sent by a client for requesting a verification; wherein the first request carries related information disclosed by the client; the related information includes: verification display, position and area for displaying;

sending, by the server computer system, the verification object selected from a verification object storage unit according to the first request; wherein each of characteristics and contents of the verification object corresponds to a keyword; the keyword corresponds to an identifier; generating a verification prompt according to a relationship of the keyword and the identifier;

Storing, by a server storage unit, a first verification code generated by the server computer system according to the verification prompt;

receiving, by the server computer system, a second request sent by the client for requesting the verification; wherein the second request carries a second verification code filled in or selected from selection items by the client according to the verification prompt;

matching, by the server computer system, the first verification code with the second verification code;

granting, by the server computer system, data access rights to the client if the first verification code matches with the second verification code;

rejecting, by the server computer system, data access request of the client if the first verification code does not match with the second verification code.

Further, the related information further includes: user disclosure information, user IP address, geographic location information, user gender, age and interest preferences and forum or website incentives for passing the verification of the user;

the verification objects are video, audio, animation, characters, text, dynamic pictures, static pictures, or combinations thereof;

the identifier is a letter, a number, a symbol or a picture.

The method further includes:

acquiring the verification object from a local or network storage server, or through directly uploading the verification object;

setting an identifier coordinate corresponding to the characteristics and contents of the verification object according to the keyword corresponding to the characteristics and contents of the verification object; and binding and storing the verification object, the keyword and the identifier coordinates in the verification object storage unit.

Further, the identifier coordinate includes: a start point coordinate of the identifier, marker type, a start point coordinate of the marker, an end point coordinate of the marker and an end point coordinate of the identifier.

The method further includes:

a control step for constituting a second verification object by combining a keyword object; wherein the keyword object is a video, an audio, an animation, a character, a text, a dynamic picture, a static picture or a combination thereof containing the keyword; the identifier coordinates of the keyword object are set according to the keyword; the keyword object, the keyword and the identifier coordinates of the keyword object are bound, and then stored in the verification object storage unit;

the keyword object is extracted from the verification object storage unit, then transmitted to the client; the keyword object is played and displayed on a surface or an adjacent location of the verification object or played as a background of the verification object, so that the second verification object is constituted by combining the verification object and the keyword object; a keyword corresponding to the second verification object and identifier coordinates of the second verification object are determined by the keyword bound by the keyword object and the identifier coordinates of the keyword object;

alternatively, the keyword object is directly generated according to the keyword corresponding to the characteristics and contents of the verification object and displayed and played on the client;

alternatively, the keyword object is directly generated according to the keyword corresponding to the characteristics and contents of the verification object and played and displayed on the surface or the adjacent location of the verification object or played as the background of the verification object.

A device for implementing the verification method, including:

a server computer system including processors and a storage unit; an acquisition module, configured to acquire keywords corresponding to characteristics and contents of verification objects displayed and played by a client; wherein the verification objects are video, audio, animation, characters, text, dynamic pictures, static pictures, or combinations thereof;

a marking module, configured to mark the characteristics and contents with identifier, and further generate a verification prompt according to relationship of the keyword and the identifier; wherein the identifier is a letter, a number, a symbol or a picture;

a second receiving module, configured to receive a second request for requesting a verification from the client; wherein the second request carries a second verification code that is filled in or selected from selection items by the client according to the verification prompt;

a second determining module, configured to acquire a first verification code associated with the keyword, the identifier and the verification prompt according to the second request; and a second judging module, configured to determine a verification result according to the first verification code and the second verification code;

the acquisition module, the marking module, the second receiving module, the second determining module and the second judging module are stored in the storage unit and operated by the processors.

Before acquiring the keyword corresponding to the characteristics and contents of the verification object displayed and played on a client, the device further includes:

a first receiving module, configured to receive a first request sent by the client for requesting the verification; wherein the first request carries related information disclosed by the client; the related information includes: verification display, position and area for displaying, the verification object, user disclosure information, user IP address, geographic location information, user gender, age and interest preferences and forum or website incentives for passing the verification of the user;

a first determining module, configured to select the verification object from a verification object storage unit according to the first request;

a sending module, configured to send the verification object to the client.

The device further includes:

a verification object storage module configured to provide a verification object storage unit; wherein the verification object storage unit is configured to store the verification object, the keyword and an identifier coordinates; wherein the verification object is acquired from a local or network storage server, or through directly uploading; the identifier coordinate corresponding to the characteristics and contents of the verification object is set according to the keyword corresponding to the characteristics and contents of the verification object; the verification object, the keyword and the identifier coordinates are bound before being stored in the verification object storage unit.

The device further includes:

a coordinate module configured to set the identifier coordinates; wherein the identifier coordinate includes: a start point coordinate of the identifier, marker type, a start point coordinate of the marker, an end point coordinate of the marker and an end point coordinate of the identifier.

The device further includes:

a control module configured to constitute a second verification object by combining a keyword object; wherein the keyword object is a video, an audio, an animation, a character, a text, a dynamic picture, a static picture or a combination thereof containing the keyword; the identifier coordinates of the keyword object are set according to the keyword; the keyword object, the keyword and the identifier coordinates of the keyword object are bound, and then stored in the verification object storage unit;

the keyword object is extracted from the verification object storage unit, then transmitted to the client; the keyword object is played and displayed on a surface or an adjacent location of the verification object or played as a background of the verification object, so that the second verification object is constituted by combining the verification object and the keyword object; a keyword corresponding to the second verification object and identifier coordinates of the second verification object are determined by the keyword bound by the keyword object and the identifier coordinates of the keyword object;

alternatively, the keyword object is directly generated according to the keyword corresponding to the characteristics and contents of the verification object and displayed and played on the client;

alternatively, the keyword object is directly generated according to the keyword corresponding to the characteristics and contents of the verification object and played and displayed on the surface or the adjacent location of the verification object or played as the background of the verification object. Based on the above technical solution, the present disclosure provides a verification method according to the keyword of the verification object. The verification object may have various forms such as advertisement and publicity work. The verification object and the keyword object may be various data types such as video, audio, animation, text, character, dynamic picture, static picture or a combination thereof. For verification objects such as advertising, publicity and so on, the keyword is the core of the content, and key slogans are also the key points to attract customers. Therefore, the present disclosure marks the content corresponding to the keyword with the identifier and generates a corresponding verification method. When a client user recognizes the verification object, the keyword and the corresponding identifier are noticed, thereby determining the corresponding verification code according to the verification prompt. Through such a verification method, the purpose of advertising is achieved while the user verifies. The verification method of the disclosure is simple. The verification can be completed by simply filling in a simple verification code or selecting a verification code from the verification items by means of "click", "touch screen" or "drag and drop", thereby reducing user resistance and speeding up the efficiency of the entire verification system.

BRIEF DESCRIPTION OF THE DRAWINGS

In order to illustrate the technical solutions of the present application more clearly, the following description of the drawings used in the present application will be briefly described. It is obvious that the drawings in the following description are only part of embodiments of the present application. For those of ordinary skills in the art, other drawings may also be obtained according to these drawings without creative efforts.

FIG. 2 is a schematic flowchart of binding of the verification object, the keyword and the identifier coordinate corresponding the keyword according to the present disclosure.

FIG. 6 is a schematic flowchart of a verification method according to another embodiment of the present disclosure.

DETAILED DESCRIPTION OF EMBODIMENTS

The technical solutions in the embodiments of the present application are clearly and completely described in the following with reference to the drawings in the embodiments of the present application. It is obvious that the described embodiments are only a part of the embodiments of the present application, and not all embodiments. It is to be understood that the preferred embodiments are not intended to limit the disclosure. And in the case of no conflict, the embodiments of the present application and the features in the embodiments may be combined. All other embodiments obtained by those skilled in the art based on the embodiments in the present application are within the protection scope of the present application.

It should be understood that the technical solutions of the embodiments of the present disclosure can be applied to various communication systems and network systems.

Embodiment 1

Figure 1:
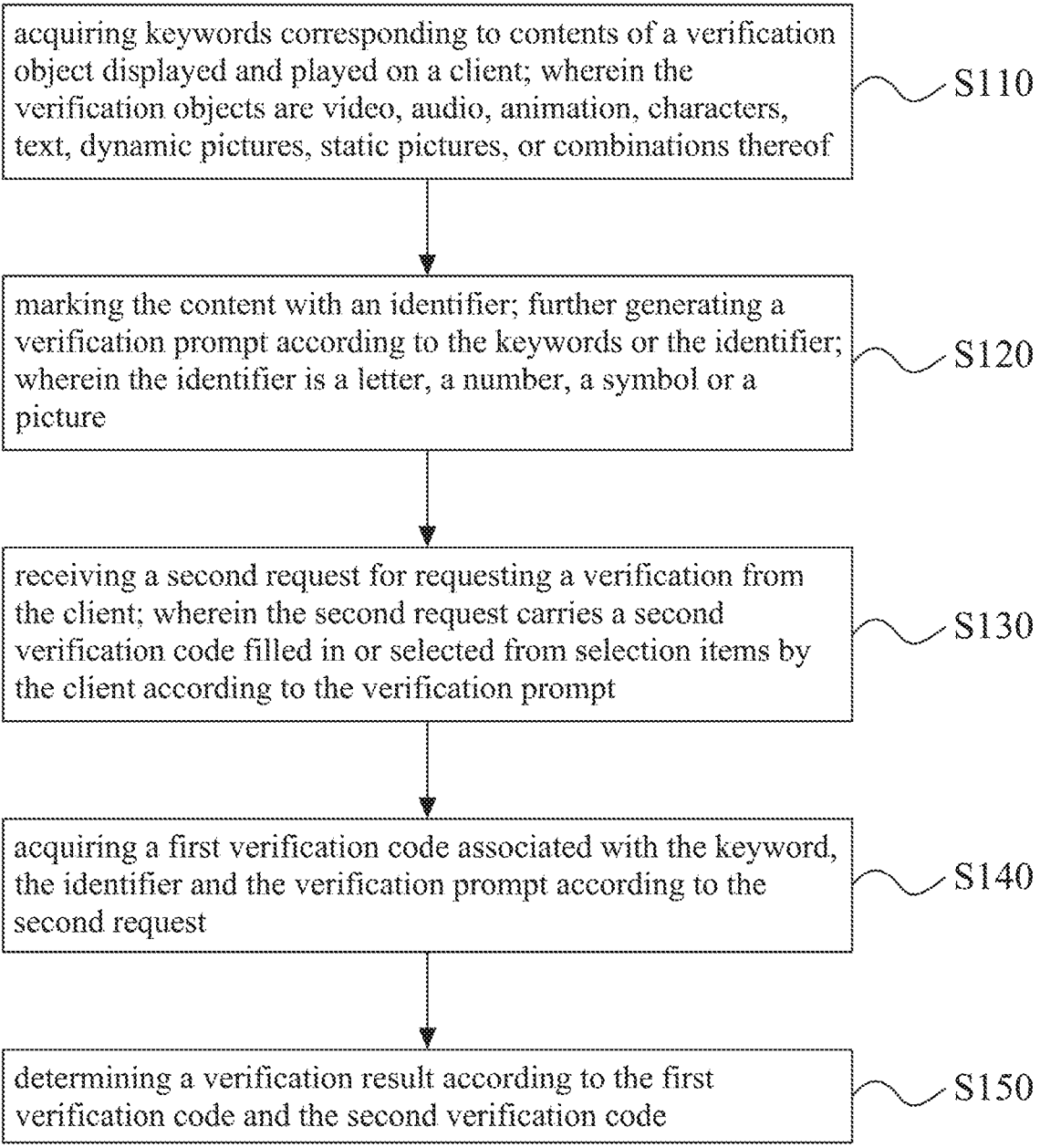
FIG. 1 is a schematic flowchart of a verification method according to an embodiment of the present disclosure.

Embodiment 1 of the present application provides a verification method, as shown in FIG. 1, includes:

S110: receiving, by a server computer system, a first request sent by a client for requesting a verification; wherein the first request carries related information disclosed by the client; the related information includes: verification display, position and area for displaying;

S120: sending, by the server computer system, the verification object selected from a verification object storage unit according to the first request; wherein each of characteristics and contents of the verification object corresponds to a keyword; the keyword corresponds to an identifier; generating a verification prompt according to a relationship of the keyword and the identifier; storing, by a server storage unit, a first verification code generated by the server computer system according to the verification prompt;

S130: receiving, by the server computer system, a second request sent by the client for requesting the verification; wherein the second request carries a second verification code filled in or selected from selection items by the client according to the verification prompt;

S140: matching, by the server computer system, the first verification code with the second verification code;

S150: granting, by the server computer system, data access rights to the client if the first verification code matches with the second verification code;

rejecting, by the server computer system, data access request of the client if the first verification code does not match with the second verification code.

The verification object displayed and played on the client and the keyword corresponding to the content of the verification object are marked. After the verification prompt is generated according to the keyword or the identifier, the second verification code is determined by the client user according to observation and understanding. The determining manner may be specifically filling in the second verification code, or selecting the second verification code from the verification selection items by means of "click", "touch screen" or "drag and drop" by the user.

In this embodiment, when the client sends a request, the client may send an information for the request to a link website, and the request is then sent by the link website. To facilitate understanding and description, the request is sent by the client in the present application, which do not be construed as limit to the disclosure.

The related information further includes: user disclosure information, user IP address, geographic location information, user gender, age and interest preferences and forum or website incentives for passing the verification of the user;

verification objects are video, audio, animation, characters, text, dynamic pictures, static pictures, or combinations thereof;

the identifier is a letter, a number, a symbol or a picture.

Embodiment 2

Figure 3:
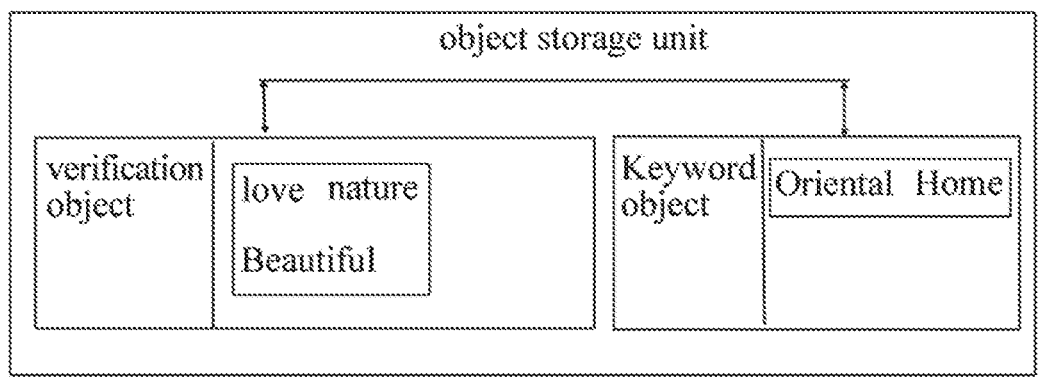
FIG. 3 is a schematic diagram of binding of the verification object, the keyword, the corresponding content of the keyword and the identifier coordinate and storage of the verification object according to the present disclosure.

FIG. 2 is a schematic flowchart of binding of the verification object, the keyword and the identifier coordinate corresponding the keyword. As shown in FIG. 3, the method further includes:

S310: providing the verification object storage unit; acquiring the verification object from a local or network storage server; or directly uploading the verification object; setting an identifier coordinate corresponding to the characteristics and contents of the verification object according to the keyword corresponding to the characteristics and contents of the verification object; binding the verification object, the keyword and the identifier coordinates; and storing the verification object, the keyword and the identifier coordinates in the verification object storage unit.

It is difficult to automatically identify the keyword corresponding to the characteristics and contents of the verification object by machine. Even if the OCR (Optical Character Recognition) technology is adopted for recognizing, it is very easy to make mistakes. Therefore, after obtaining the appropriate verification object, the keyword corresponding to the characteristics and contents and the identifier coordinates corresponding to the characteristics and contents can be manually set according to the characteristics and contents of the verification object, and bound to the verification object. For example, a verification object is a real estate advertisement video, and the keyword corresponding to the characteristics and contents is "Good homes". This keyword corresponding to the characteristics and contents is difficult to be automatically recognized by the machine. Therefore, the "identifier" in the format of "a real estate, a good home, XXXX" can be manually set according to the characteristics and contents, wherein "XXXX" indicates the identifier coordinate (can be set to pause or stop at this location to where the video is played) in the video of the characteristics and contents corresponding to the keyword "good homes". For example, the characteristics and contents "Good homes" corresponding to the keyword appears in the center of the video, the identifier coordinate "XXXX" marks the corresponding location. The "identifier" in the format of "a real estate, a good home, XXXX" is bound to the real estate advertisement video of the real estate advertisement. The binding manner may use the unique ID of the video according to the "identifier", and the ID used as the video name to store the video in the verification object storage unit. There are various binding manners. In this way, when the video is acquired, the keyword and the identifier coordinate corresponding to the video characteristics and contents can be accordingly obtained. Further, the characteristics and contents is marked according to the identifier used. Finally, a verification prompt is generated according to the keyword or the identifier. When the second verification code is filled in or selected from the selection items by the client user according to the verification prompt, the system obtains the keyword, the identifier and the first verification code corresponding to the verification prompt, and compares the first verification code with the second verification code, finally determines whether the user passes the verification. It should be understood that the ID can be further encrypted according to the "identifier", and a decryption step can be performed when the ID is read, thereby improving the security of the system. The above descriptions do not constitute a limitation of the present disclosure.

Embodiment 3

FIG. 3 is a schematic diagram of binding of the verification object, the keyword, the corresponding characteristics and contents of the keyword and the identifier coordinate and storage of the verification object. Based on the embodiment 2, as shown in FIG. 3, the method further includes:

S310: providing the verification object storage unit; acquiring the verification object from a local or network storage server; or directly uploading the verification object; setting an identifier coordinate corresponding to the characteristics and contents of the verification object according to the keyword corresponding to the characteristics and contents of the verification object; binding the verification object, the keyword and the identifier coordinates; and storing the verification object, the keyword and the identifier coordinates in the verification object storage unit.

Figure 4:
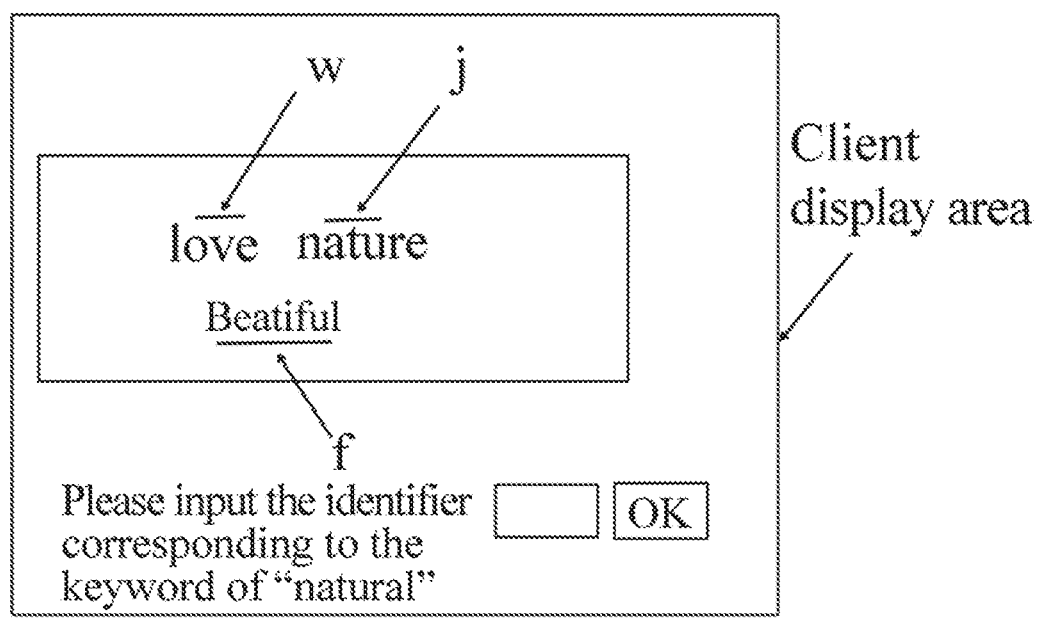
FIG. 4 is a diagram showing a client display according to an embodiment of the present disclosure.

For simplicity, a picture is exemplified as the verification object (the majority of following verification objects are in the form of picture). As shown in FIG. 3, a keyword corresponding to a picture characteristics and contents is "Love Nature Beautiful" (picture). The picture characteristics and contents is difficult to identify by machine. The keyword is manually set to "love", which is only set a start point coordinate of x1. The keyword is set to "natural", which is set a start point coordinate of x2. In order to indicate the two words are composed of two Chinese characters, the identifier type of "straight line" and the start point coordinate of x21 and the end point coordinate of x22 are set. Similarly, the keyword is set to "Beautiful", which is set a start point coordinate of x3. Then the identifier type of "straight line" and the start point coordinate of x31 and the end point coordinate of x32 are set. An unique ID of the picture can be redacted. For example, the IDs are (love, x1; natural, x2, straight line, x21, x22; Beautiful, straight line, x31, x32). The IDs are used as the name of the pictures, directly bound to the pictures. The IDs also can be stored in the text corresponding to the pictures. Finally, the verification objects and the pictures are stored in the verification object storage unit, as shown in FIG. 4. Similarly, the keyword object is set to "Oriental Home" (picture), the corresponding keyword and identifier coordinates (Oriental, y1; straight line, y11, y12; home, y2; straight line, y21, y22) are bound, the keyword objects are stored in the verification object storage unit, as shown in FIG. 3.

It should be understood that the identifier coordinates of the characteristics and contents are used to record the position of the characteristics and contents corresponding to the keywords in the picture, the format of the type and position of the identifier. The identifier coordinates may also contain more information characteristics and contents, which may be updated as required. When the picture is displayed on the client, the picture can be stretched, rotated, etc. . . . The specific coordinate position of the corresponding identifier coordinate information on the client can be calculated by the system. The marking of the characteristics and contents can be completed by assistance of the professional software. In addition, there are many ways to bind keywords and corresponding identifier coordinates, and which should not constitute a limitation of the present disclosure.

Embodiment 4

Figure 5:
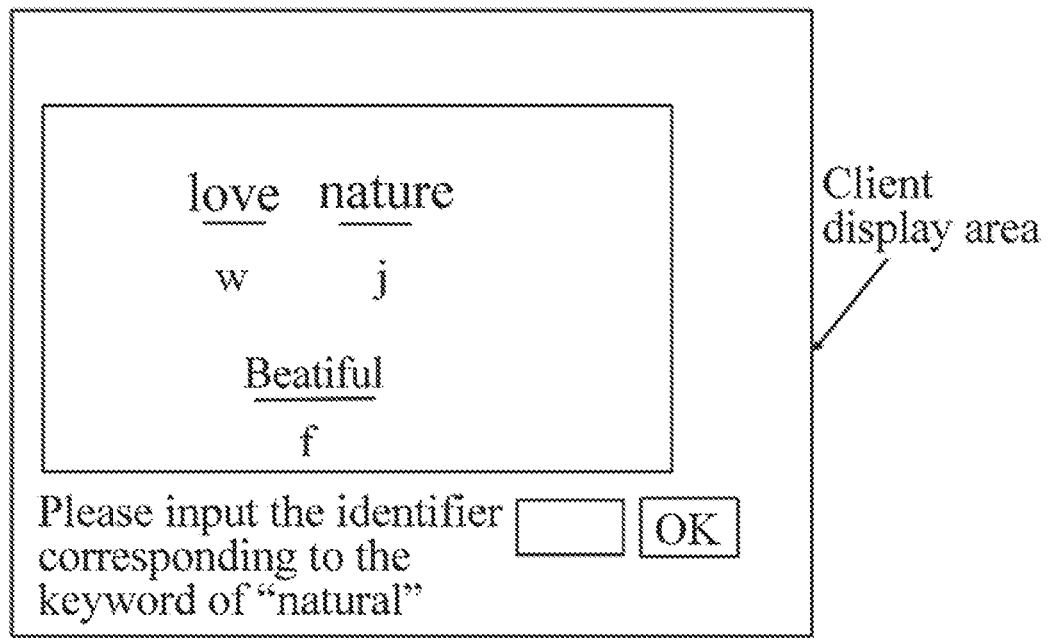
FIG. 5 is a diagram showing another client display according to an embodiment of the present disclosure.

In order to facilitate the understanding of the present disclosure, based on embodiments 1 and 2, with reference to FIGS. 4-5. As shown in FIG. 4, a verification method includes:

Selecting the verification object from an verification object storage unit according to the first request. In this embodiment, "Love Nature" (picture) is selected as the verification object, wherein the verification object is bound with the relevant keywords and the identifier coordinates corresponding to the characteristics and contents.

As shown in FIG. 4, a verification method includes

Acquiring keywords of "love", "natural", and "Beautiful" corresponding to the content of the "Love Nature Beautiful" (picture) displayed and played on the client.

Marking the content with an identifier, and further generating a verification prompt according to the keyword or the identifier. Wherein the identifier is a letter, a number, a symbol or a picture. In this embodiment, according to the keyword bound with the verification object and the identifier coordinates corresponding to the content, an identifier and a start point of the identifier are displayed on the picture, and the corresponding content of "love", "natural" and "Beautiful" are marked (labeled) with English letters of w, j, and f randomly generated and used as the identifier respectively. Further, a verification prompt is generated according to the keywords or the identifiers. In the present embodiment, the verification prompt is "Please input the identifier corresponding to the keyword of 'natural'", as shown in the FIG. 4.

Receiving a second request for requesting a verification from the client; wherein the second request carries a second verification code that is filled in or selected from selection items by the client according to the verification prompt. In this embodiment, the second verification code of "*" (* indicates the content to be filled in by user) is filled in by the client.

Acquiring a first verification code associated with the keyword, the identifier and the verification prompt according to the second request. In this embodiment, the first verification code of identifier "j" corresponding to the keyword "natural" is acquired according to the keyword, the identifier and the verification prompt.

Determining a verification result according to the first verification code of "j" and the second verification code of "*". It is determined that whether the user passes the verification after comparing the verification result.

The keyword content and location in the picture are difficult to identify by machine. After the keyword content is marked by the random identifier, the verification prompt is generated according to the keyword or the identifier. In this embodiment, the user only needs to fill in a simple letter to complete the verification. The verification process is simple and difficult to crack by machine. The identifier letters can be randomly generated. For the same verification object, the same keyword can be continuously used for verification, thereby extending the application range of the disclosure.

It should be understood that, in the present embodiment as shown in FIG. 4, if an end point of the identifier coordinates is not given, the system can calculate the end point according to the start point of the identifier coordinates, the size of the picture and the size of the display area of the client. The start point of the identifier coordinates points to the end point of the identifier coordinates by "arrow", which can be set by the system or set randomly. In addition, it is also possible to "display" directly on the verification object without affecting the user's understanding. The keyword is directly marked by the identifier, as shown in FIG. 5. It should also be understood that the identifiers may have various options. For example, the letters and symbols may be further formed into a picture, and then the keyword content of the verification object may be marked to further improve system security. Further, the color and type of the identifiers, the type of the pointing symbol and the like may be of different kinds, which do not constitute a limitation of the present disclosure.

Embodiment 5

Figure 7:
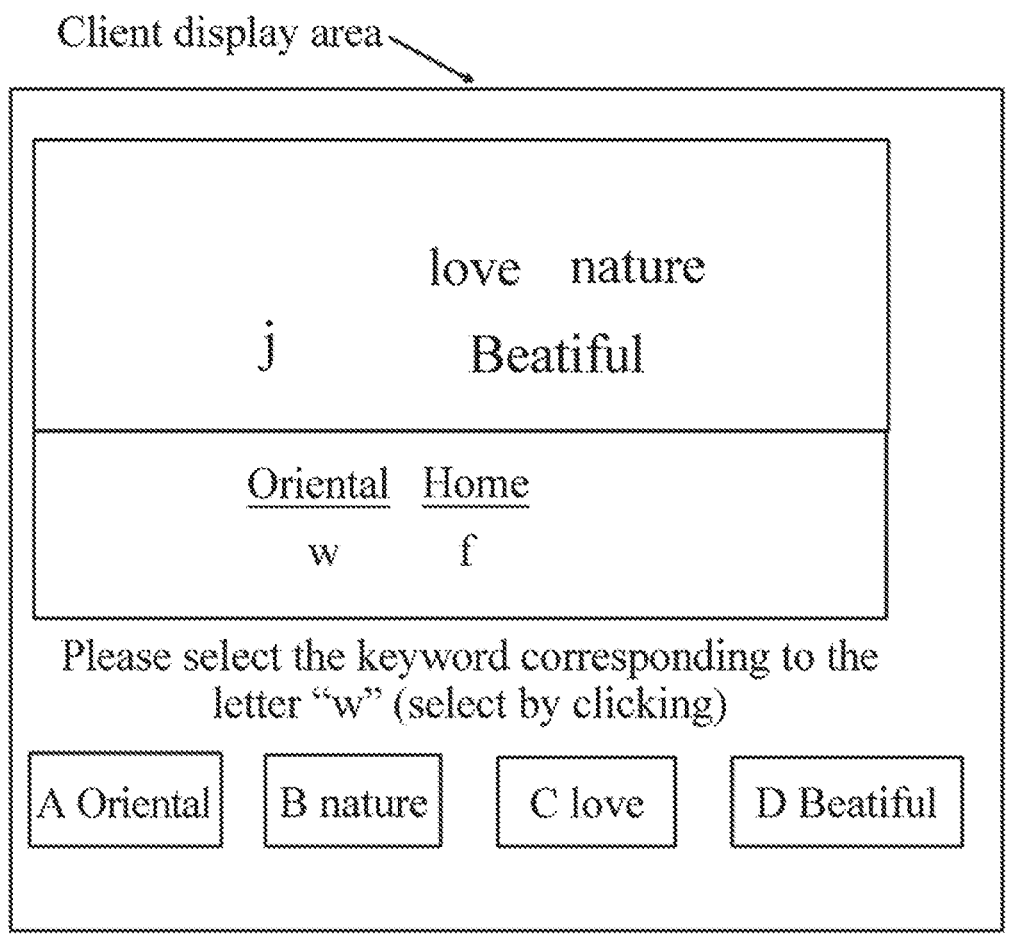
FIG. 7 is a diagram showing a client display according to another embodiment of the present disclosure.
Figure 8:
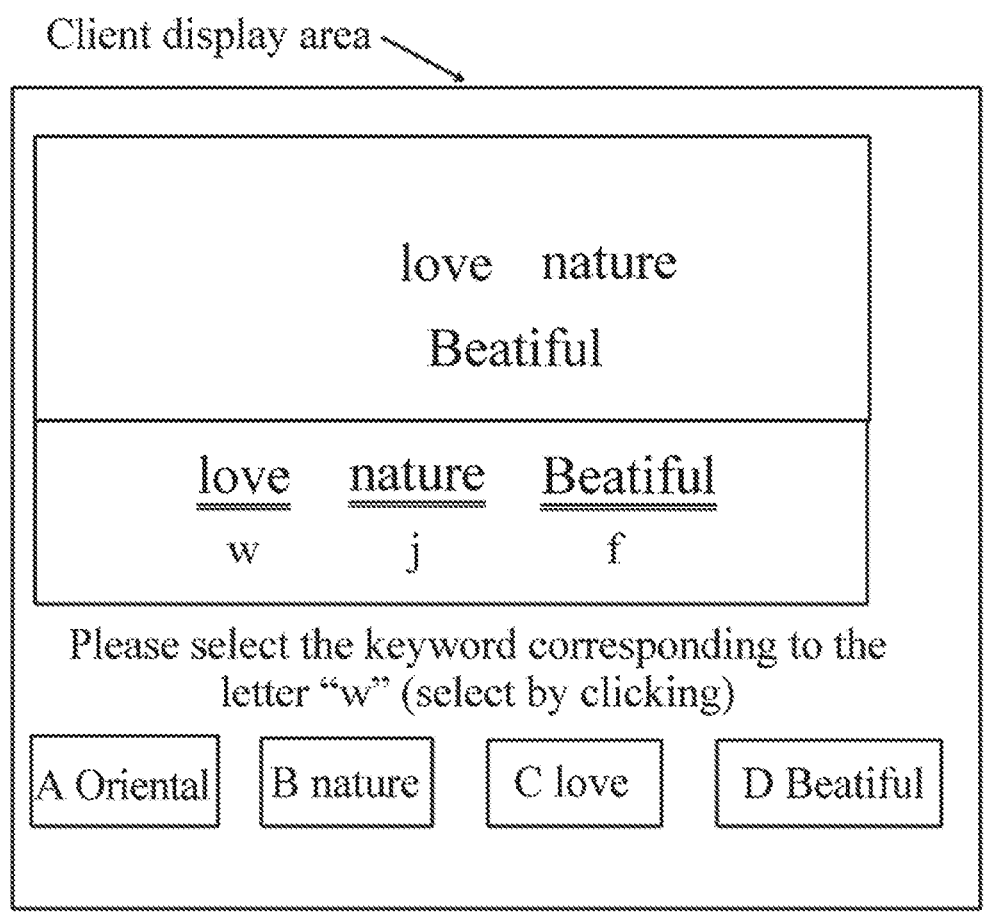
FIG. 8 is a diagram showing a client display according to another embodiment of the present disclosure.

In order to facilitate the understanding of the present disclosure, based on embodiments 1 and 2, with reference to FIGS. 6-8, an illustrative flow chart and client display are shown.

In this embodiment, "Love Nature" (picture) is selected as the verification object, wherein the verification object is bound with the relevant keywords and the identifier coordinates corresponding to the content.

As shown in FIG. 6, a verification method includes:

S710: Control Step

The control step used to constitute a second verification object by combining a keyword object. The keyword object is a video, an audio, an animation, a character, a text, a dynamic picture, a static picture or a combination thereof. The identifier coordinates of the keyword object are set according to the keyword. The keyword object, the keyword and the identifier coordinates of the keyword object are bound, and then stored in the verification object storage unit. The keyword object can be extracted from the verification object storage unit, then transmitted to the client. The keyword object is played and displayed on a surface or an adjacent location of the verification object or played as a background of the verification object, so that the second verification object is constituted by combining the verification object and the keyword object. At this time, a keyword corresponding to the second verification object and identifier coordinates of the second verification object are determined by the keyword bound by the keyword object and the identifier coordinates of the keyword object. Alternatively, the keyword object is directly generated according to the keyword corresponding to the characteristics and contents of the verification object and displayed and played on the client. Alternatively, the keyword object is directly generated according to the keyword corresponding to the characteristics and contents of the verification object and played and displayed on the surface or the adjacent location of the verification object or played as the background of the verification object. In this embodiment, through the controlling step, as shown in FIG. 3, the keyword object of "Oriental Home" (picture) is selected, and the keyword object is bound to the corresponding keyword and the identifier coordinates corresponding to the characteristics and contents. The keyword object of "Oriental Home" (picture) is transmitted to the client and displayed below the verification object of "Love Natural" (picture), as shown in the FIG. 7.

S720: Acquiring keywords included in the characteristics and contents of the verification object displayed and played on the client. The verification object "Love Nature Beautiful" (picture) and the keyword object "Oriental Home" (picture) are formed a second verification object and overall displayed on the client after being combined. The keyword of the corresponding second verification object is selected as the keyword "Oriental" and "Home" bound by the keyword object.

S730: Marking the content with an identifier, and further generating a verification prompt according to the keyword or the identifier. The identifier is a letter, a number, a symbol or a picture. Here, the system calculates the characteristics and contents of "Oriental" and "Home" and displays the identifier coordinates on the client according to the content of the verification object "Oriental" and "Home", the corresponding identifier coordinates and the size of the client display area, etc. . . . The content of "Oriental" and "Home" are marked by the randomly generated letters w, f respectively. At the same time, the random letter j is used to randomly mark a point on the picture to generate an interference item, so as to increase the cracking difficulty by machine. Further, a verification prompt of "Please select the keyword corresponding to the letter 'w' (selected by clicking)" is generated according to the identifier "w". Here, the corresponding verification selection items are also generated, wherein at least one of the selection items contain the real keyword corresponding to the letter "w", and the remaining items may be other unrelated keywords, or may be randomly generated by the system. It should also be understood that the verification prompt can be generated by keywords or identifiers. In this embodiment, the verification prompt can also be "please select the identifier corresponding to the keyword of 'Oriental'". It should also be understood that the generation of the corresponding selection items may be in various forms, and the display position of the selection items on the client may be in various situations, which should not constitute a limitation of the present disclosure.

S740: Receiving a second request for requesting a verification from the client. Wherein the second request carries a second verification code of "*" (* indicates the item selected by user) that is filled in or selected from selection items by the client according to the verification prompt.

S750: Acquiring a first verification code associated with the keyword "Oriental", the identifier of "w" and the verification prompt of "Please select the keyword corresponding to the letter 'w' (select by clicking)" according to the second request. When the user selects the "A Oriental" by clicking, the system gives "Oriental" to the first verification code. In other words, when the user selects the "A Oriental", the first verification code of "Oriental" is determined.

S760: Determining a verification result according to the first verification code of "Oriental" and the second verification code of "*". Judging whether the user passes the verification by comparing the verification result.

In S710, the manners of construction of the second verification object by combining the keyword objects are various. For example, it is assumed that the verification object "Love Nature Beautiful" (picture) is only bound with "Love", "Nature" and "Beautiful" and not bound with the identifier coordinates of the corresponding content. The corresponding picture "Love Nature Beautiful" (picture) as the keyword is directly generated according to the keyword "Love", "Nature" and "Beautiful". The corresponding picture "Love Nature Beautiful" (picture) is displayed below the verification object "Love Nature Beautiful" (picture). The specific form is shown in FIG. 8. When the corresponding picture is displayed, it can be rotated, scaled, etc. For the keyword object generated by the system, the corresponding keyword contents "Love", "Nature" and "Beautiful" can be marked with the random letters w, j, and f used as the identifiers respectively (the system can automatically sets and calculates factors such as the identifier coordinates). Therefore, a verification prompt or the like is further generated based on the keyword and the identifier. In this way, the application of the present disclosure can be further extended and the related steps can be simplified, that is, only the keywords of the verification object need to be known, and the corresponding verification process can be generated by the method of the present disclosure. It should be understood that the manners of construction of the second verification object by combining the keyword objects is various. The verification object and the keyword object to be combined can be bound in advance, and recorded in the storage unit, and sent to the client when in use. Alternatively, the corresponding keyword object can be generated on the client according to a method set by the system and then combined with the verification object. These combinations, data storage, transmission mode and the like do not constitute a limitation of the present disclosure.

It should be understood that the manner of constructing the second verification object by combining the keyword objects expands the manners of combining the verification object and the keyword object. The verification object and the keyword can be completely separated in theory. The keyword object directly bound with the keyword is displayed and played on the surface of the verification object or its vicinity. From the perspective of the human visual effect, it can be considered that the verification object and keyword object directly bound with the keyword are a whole, which is equivalent to bind the keyword to the verification object, thereby forming a corresponding verification. This manner is more extensive and convenient in application than a verification method by directly changing the data format of the verification object and binding the keywords. In addition, it is further possible to directly generate a second keyword object by the bound keywords, and directly "replace" the original verification object. Alternatively, it is possible to generate the new keyword object which is displayed and played on the surface of the verification object or its vicinity according to the keywords bound of the verification object. The existing verification object can be scaled, rotated and moved as needed. Through these methods, not only the application is convenient, but also the content can be further displayed to highlight its effect. In addition, the keyword object can be dynamically or statically displayed on the surface of the verification object of "xx brand of car zero down payment" or the adjacent position, which can be displayed in the form of "suspension window", "transparent", "translucent", "photo frame" and the like. The "time" and "time period" to be displayed may be set by the system or randomly processed, which should not constitute a limitation of the present disclosure. The displaying conditions on the client of the verification object and the keyword object can be determined by the system. The displaying conditions are, For example, the number of displaying and the number of times of combination. The above description should not constitute a limitation of the present disclosure.

Embodiment 6

Figure 9:
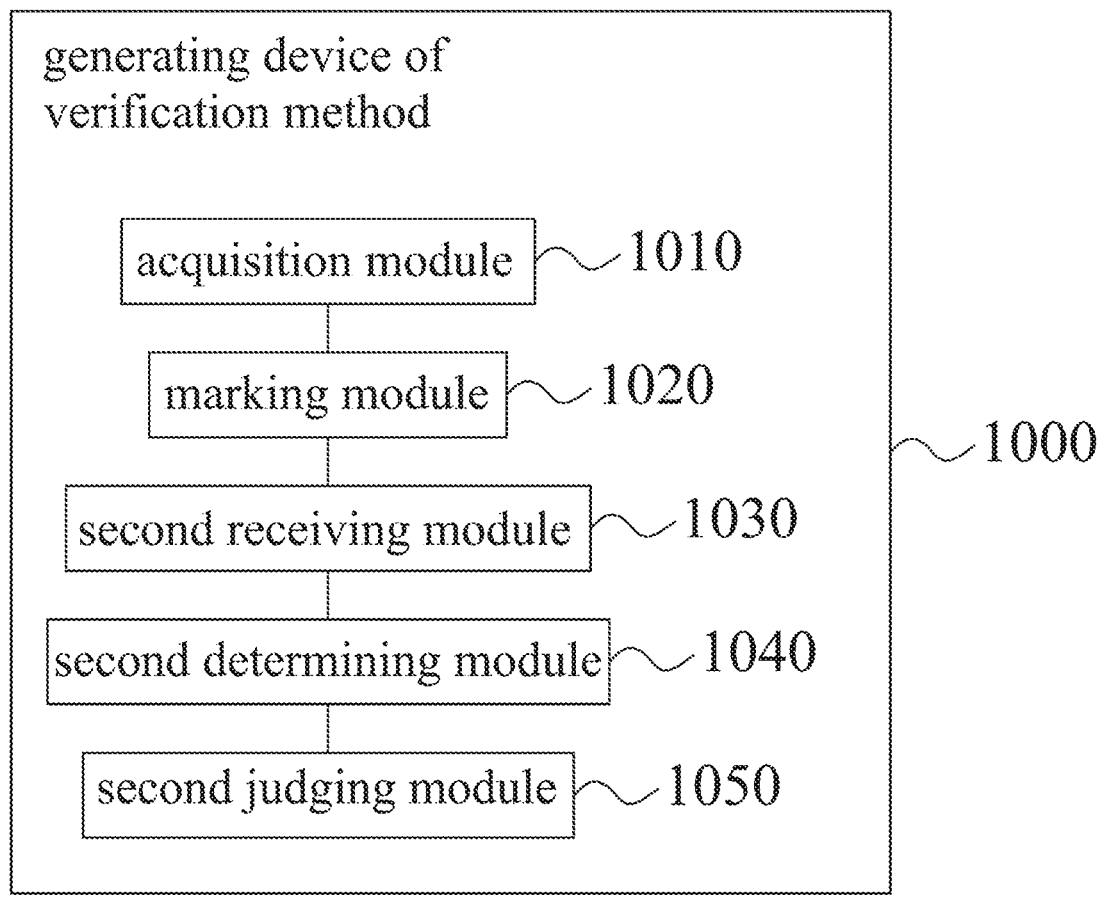
FIG. 9 is a schematic diagram of devicea device for implementing verification method according to an embodiment of the present disclosure.

As shown in FIG. 9, a device 1000 for implementing the verification method according to an embodiment of the present disclosure includes:

a server computer system 10 including processors 101 and a storage unit 102;

an acquisition module 1010, configured to acquire a keyword corresponding to a characteristics and contents of a verification object displayed and played by a client 2000; wherein the verification object is a video, an audio, an animation, a character, a text, a dynamic picture, a static picture, or a combination thereof;

a marking module 1020, configured to mark the characteristics and contents with an identifier, and further generate a verification prompt according to relationship of the keyword and the identifier; wherein the identifier is a letter, a number, a symbol or a picture;

a second receiving module 1030, configured to receive a second request for requesting a verification from the client; wherein the second request carries a second verification code that is filled in or selected from selection items by the client according to the verification prompt;

a second determining module 1040, configured to acquire a first verification code associated with the keyword, the identifier and the verification prompt according to the second request;

a second judging module 1050, configured to determine a verification result according to the first verification code and the second verification code.

the acquisition module, the marking module, the second receiving module, the second determining module and the second judging module are stored in the storage unit 102 and operated by the processors 101.

The device 1000 communicates with the client 2000 via a network 3000.

Figure 10:
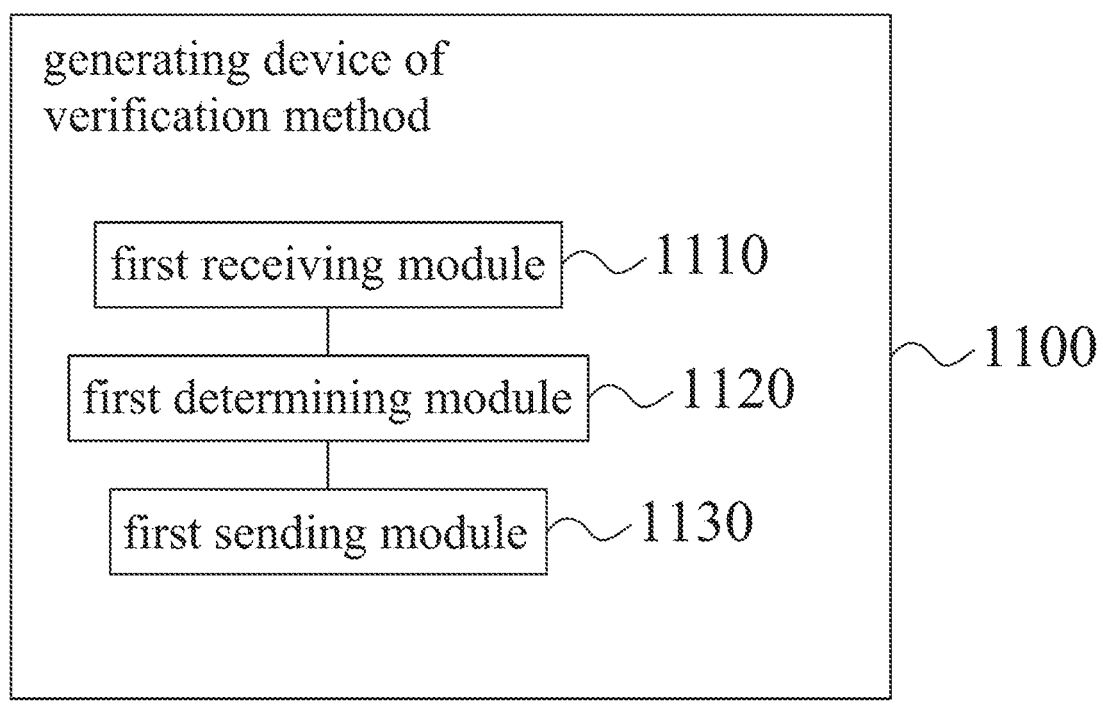
FIG. 10 is a schematic diagram of devicea device for implementing verification method according to another embodiment of the present disclosure.
Figure 11:
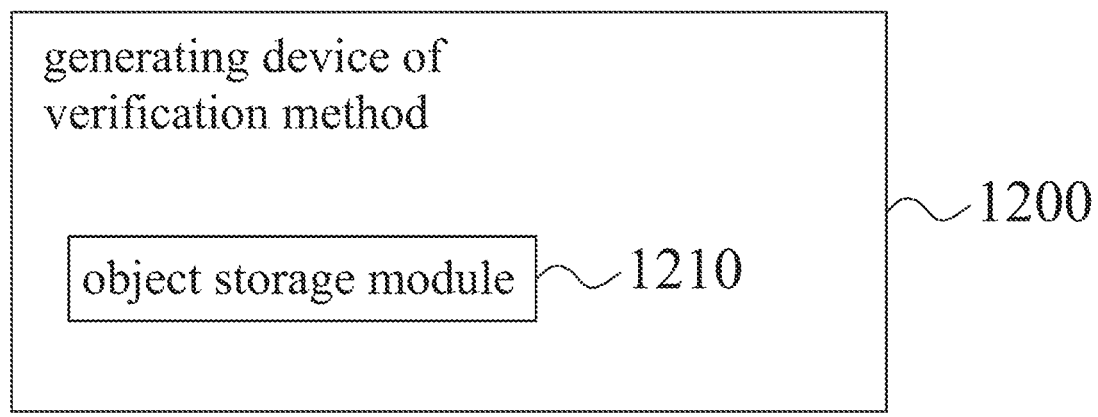
FIG. 11 is a schematic diagram of devicea device for implementing verification method according to another embodiment of the present disclosure.

As shown in FIG. 10, the device 1000 for implementing the verification method according to another embodiment of the present disclosure, further includes:

a first receiving module 1110, configured to receive a first request sent by the client for requesting the verification; wherein the first request carries related information disclosed by the client; the related information includes: verification display, position and area for displaying, the verification object, user disclosure information, user IP address, geographic location information, user gender, age and interest preferences and forum or website incentives for passing the verification of the user;

a first determining module 1120, configured to select the verification object from a verification object storage unit according to the first request;

a sending module 1130, configured to send the verification object to the client.

As shown in FIG. 10, the device 1000 for implementing the verification method according to another embodiment of the present disclosure, further includes:

a verification object storage module 1210 configured to provide a verification object storage unit; wherein the verification object storage unit is configured to store the verification object, the keyword and an identifier coordinates; wherein the verification object is acquired from a local or network storage server, or through directly uploading; the identifier coordinate corresponding to the characteristics and contents of the verification object is set according to the keyword corresponding to the characteristics and contents of the verification object; the verification object, the keyword and the identifier coordinates are bound before being stored in the verification object storage unit.

Embodiment 7

Figure 12:
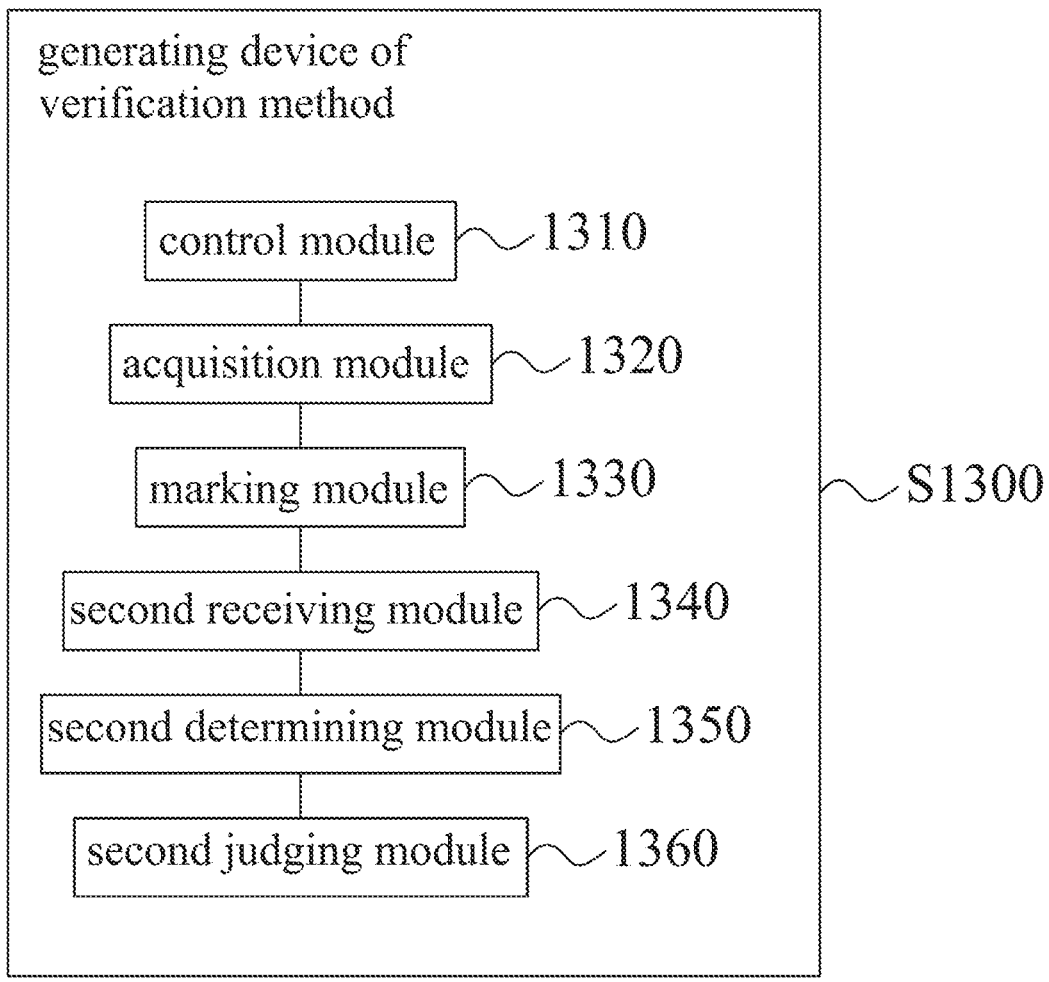
FIG. 12 is a schematic diagram of devicea device for implementing verification method according to another embodiment of the present disclosure.

As shown in FIG. 12, a device 1000 for implementing the verification method according to another embodiment of the present disclosure includes:

A control module 1310 configured to constitute a second verification object by combining a keyword object. The keyword object includes a video, an audio, an animation, a character, a text, a dynamic picture, a static picture or a combination thereof. The identifier coordinates corresponding to the characteristics and contents is set according to the keyword corresponding to the characteristics and contents. The keyword object, the corresponding keyword and the identifier coordinates corresponding to the characteristics and contents are bound and stored in the verification object storage unit. The verification object may be constituted a second verification object by combining a keyword object. The keyword object can be extracted from the verification object storage unit, then transmitted to the client. The keyword object is played and displayed on the surface or adjacent location of the verification object or played as a background of the verification object. So that the second verification object is constituted by combining the verification object and the keyword object. At this time, the keyword corresponding to the second verification object and the identifier coordinates corresponding to the characteristics and contents are determined by the keyword bound by the keyword object and the identifier coordinates corresponding to the characteristics and contents. Alternatively, the keyword object can be directly generated according to the keyword corresponding to the characteristics and contents of the verification object and displayed and played on the client. Alternatively, the keyword object can be directly generated according to the keyword corresponding to the characteristics and contents of the verification object and played and displayed on the surface or adjacent location of the verification object or played as a background of the verification object.

An acquisition module 1320 configured to acquire a keyword corresponding to a characteristics and contents of a verification object displayed and played by a client. Wherein the verification object is a video, an audio, an animation, a character, a text, a dynamic picture, a static picture, or a combination thereof.

A marking module 1330 configured to mark the characteristics and contents with an identifier, and further generate a verification prompt according to the keyword or the identifier. Wherein the identifier is a letter, a number, a symbol or a picture.

A second receiving module 1340 configured to receive a second request for requesting a verification from the client. Wherein the second request carries a second verification code that is filled in or selected from selection items by the client according to the verification prompt.

A second determining module 1350 configured to acquire a first verification code associated with the keyword, the identifier and the verification prompt according to the second request.

A second judging module 1060, configured to determine a verification result according to the first verification code and the second verification code.

Embodiment 8

Figure 13:
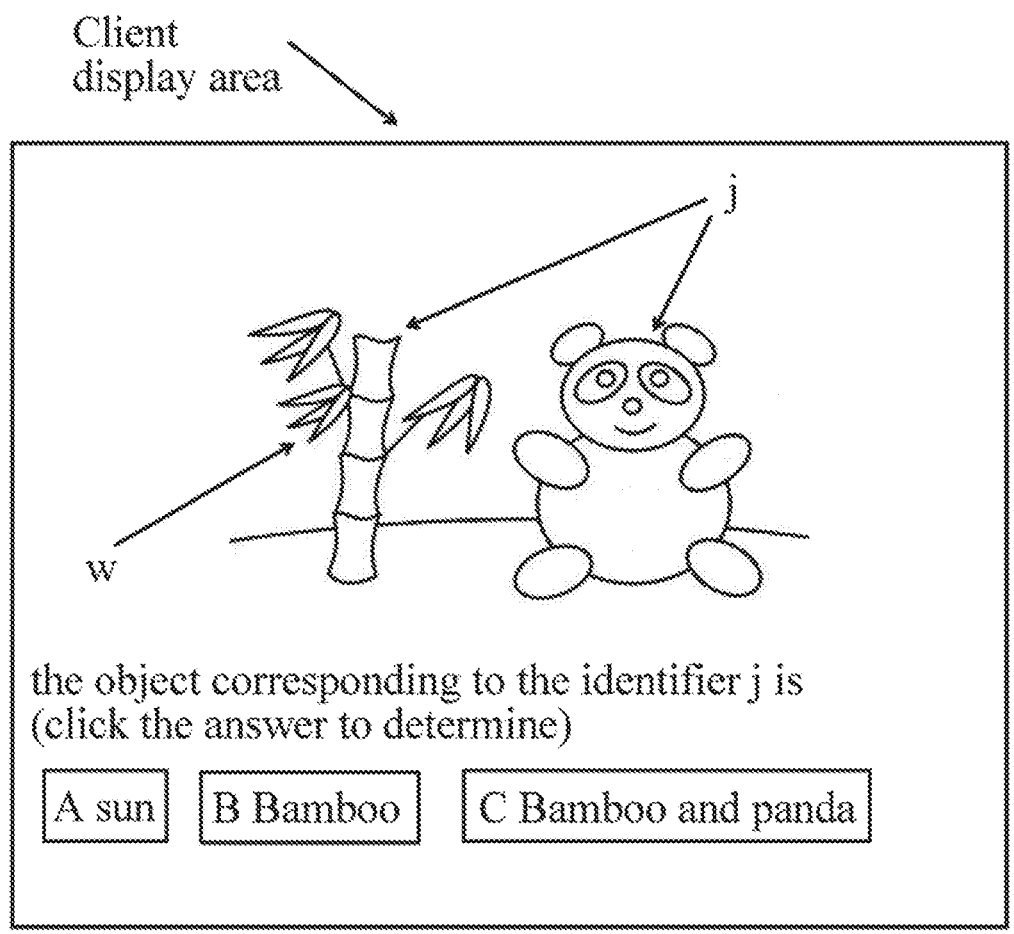
FIG. 13 is a diagram showing a client display according to another embodiment of the present disclosure.
Figure 14:
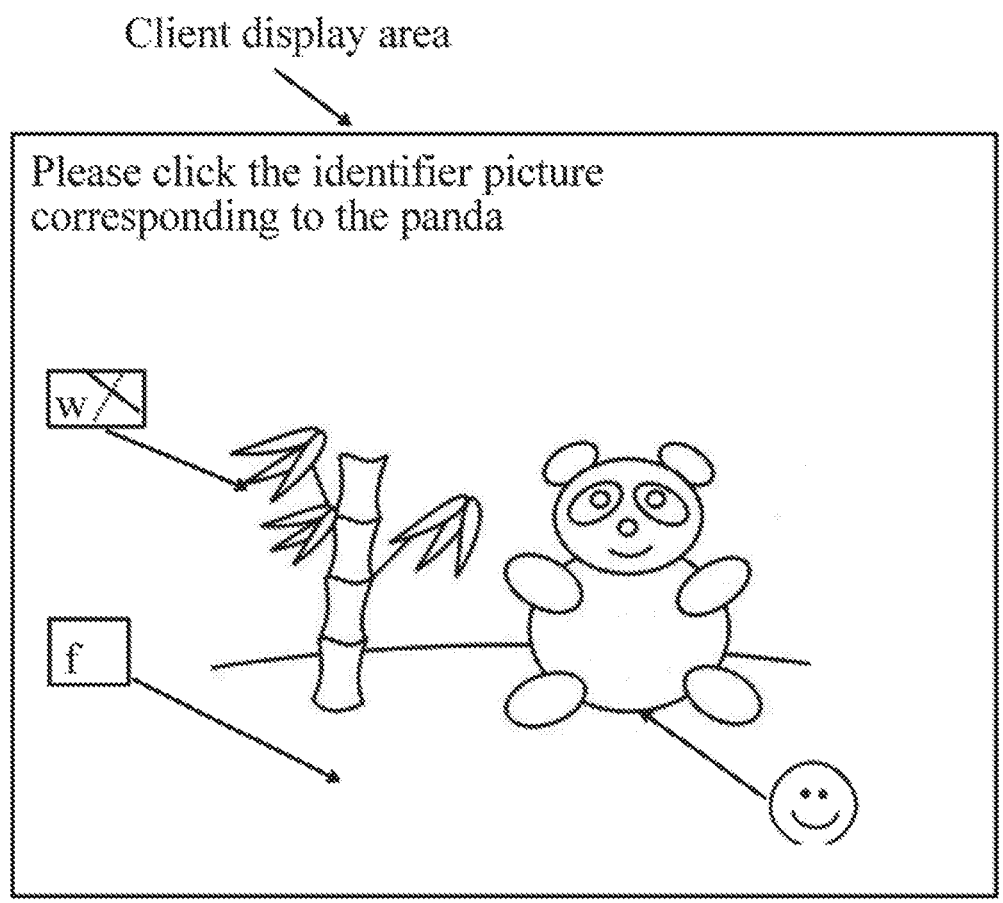
FIG. 14 is a diagram showing a client display according to another embodiment of the present disclosure.

FIG. 13 is a client 2000 display diagram according to another embodiment of the present disclosure. FIG. 14 is a client display diagram according to another embodiment of the present disclosure. The verification methods are not repeated.

It should be understood that the content of the verification object in the picture, especially the details are difficult to identify for the machine. The identifiers can be randomly generated, which may be letters, symbols, pictures, etc. . . . The identifiers also can be extended to other types of situations by relevant technicians. For example, the identifier can also be an animation, a video, etc. . . . The data can be regarded as an identifier as long as its content can be observed by a person. The identifier can be randomly generated by the system, or pre-stored by a special storage unit and called out when it is to be used.

It should be understood that, as shown in FIG. 13, as long as the understanding of the identifier and corresponding object content are not affected, the start points of the verification object can be multiple positions. In addition, the relationship between the identifier and the object content corresponding to the identifier may be different situations and different combinations. For example, picture contents of "bamboo" and "panda" may be simultaneously marked with the letter "j". A verification prompt "the object corresponding to the identifier j is (click the answer to determine)" can be generated, as shown in FIG. 14. The above description do not constitute a limitation of the present disclosure.

Figure 15:
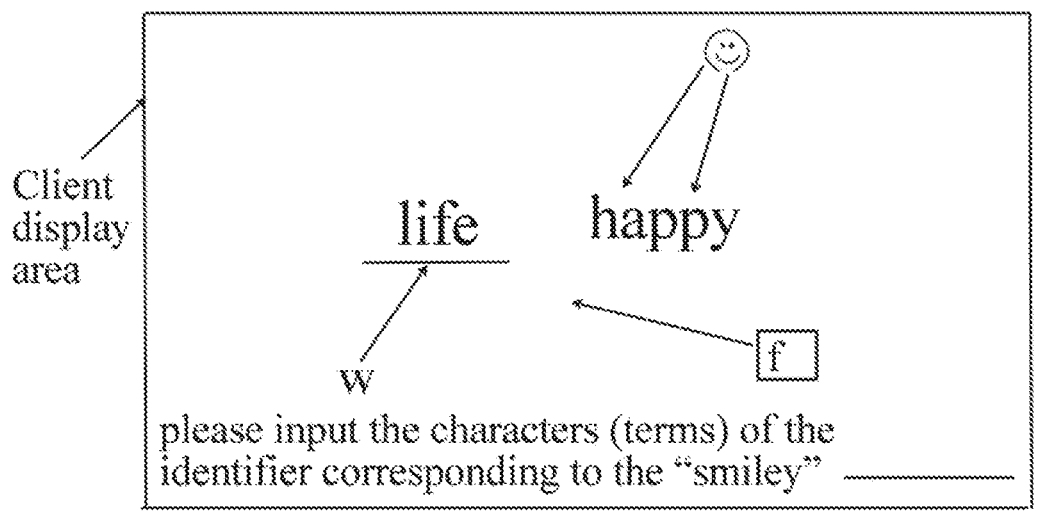
FIG. 15 is a diagram showing a client display according to another embodiment of the present disclosure.

It should be understood that the composition of the selection items may be directly constituted by the corresponding identifier. When the user clicks or drags the corresponding identifier according to the verification prompt, this behavior may be regarded as an action of selecting the second verification code, as shown in FIG. 14. The corresponding verification prompt may be: "Please click the identifier picture corresponding to the panda". In FIG. 14, the identifier "smiley" is used to mark the content of "panda" in the picture. The identifier is formed by a picture containing letters and a number of interference lines. In FIG. 15, a picture containing "f" is provided to mark the blank area of the verification object and the "f" serves as a disturbance item. The content of the picture constituting the identifier may also be various. For example, in FIG. 15, picture "smiley" is used to mark the content of "panda". In addition, the composition and form of selection items and composition of the interference items and the like do not constitute a limitation of the present disclosure.

The verification result is determined according to the first verification code and the second verification code. Whether the user passes the verification is determined by comparing the verification result. It should be understood that the first verification code and the second verification code are not unique. For example, a verification prompt "please select the identifier corresponding to the object you like" may be made. No matter which identifier (identifiers) the user selects, the first verification code and the second verification code can be set to match, so that the user can pass the verification. The manners in which the verification result is determined according to the first verification code and the second verification code may be various, which do not constitute a limitation of the present disclosure.

Embodiment 9

FIG. 15 is a client display diagram according to another embodiment of the present disclosure. In this embodiment, the verification object designed is an audio file, the content of which is a "happy life" speech. The bound keyword is "happy life". A picture containing the content of the keyword "happy life" is directly generated and displayed in the client display area. The audio "happy life" is played at the same time. After marking the content in the picture by identifier, a verification prompt is generated as follows: Please input the Chinese character corresponding to the "smiley" (Word) _____. The specific process of the verification method of this embodiment can refer to the above preferred embodiment, and will not be repeated.

It should be understood that the verification object of this embodiment can be regarded as an audio or a combination of audio and picture "happy life". The verification object may be other forms. The relevant technicians can obtain other specific embodiments by combining and expanding the above embodiments. Other forms of the verification objects will not described in detail in the description.

A person skilled in the art can clearly understand that the specific working process of the system, the device and the module described above can refer to the corresponding process in the above embodiments, and will not be described here. The systems, devices, and modules disclosed in the present application may be implemented in other manners. For example, the embodiments of devices described above are merely illustrative. For example, the division of the modules is only a logical function division, which may have other division manners in the actual implementation. For example, multiple modules may be combined or integrated into one system. Some features can be ignored or not executed. In addition, the functional modules may or may not be physically separated. The components of the functional modules may or may not be physical units, that is, may be located in one place or distributed to multiple network units. Some or all of the units may be selected according to actual needs to achieve the purpose of the disclosure.

It should be understood that for those of ordinary skills in the art, improvements or variations can be made based on the above descriptions, and such improvements and variations fall within the scope of the appended claims.

The embodiments are only illustrative of the present disclosure, and apparently the implementations are not limited by the above modes. The embodiments described herein and various modifications based on the ideas and technical solutions of the present disclosure fall within the scope of the present application.

What is claimed is:

1. A keyword verification method for data access, comprising:
    receiving, by a server computer system, a first request sent by a client device for requesting a verification; wherein the first request carries related information disclosed by the client device; the related information comprises: verification display, position and area for displaying;
    sending, by the server computer system, a verification object of verification objects selected from a verification object storage unit according to the first request; wherein each of characteristics and contents of the verification object corresponds to a keyword; the keyword corresponds to an identifier; generating a verification prompt according to a relationship of the keyword and the identifier;
    storing, by a server storage unit, a first verification code generated by the server computer system according to the verification prompt;
    receiving, by the server computer system, a second request sent by the client device for requesting the verification; wherein the second request carries a second verification code filled in or selected from selection items by the client device according to the verification prompt;
    matching, by the server computer system, the first verification code with the second verification code;
    granting, by the server computer system, data access rights to the client device if the first verification code matches with the second verification code;
    rejecting, by the server computer system, data access request of the client device if the first verification code does not match with the second verification code.

2. The method according to claim 1, wherein the related information further comprises: user disclosure information, user IP address, geographic location information, user gender, age and interest preferences and forum or website incentives for passing the verification of the user;
    wherein the verification objects are video, audio, animation, characters, text, dynamic pictures, static pictures, or combinations thereof;
    wherein the identifier is a letter, a number, a symbol or a picture.

3. The method according to claim 2, further comprising:
    acquiring the verification object from a local or network storage server, or through directly uploading the verification object;
    setting an identifier coordinate corresponding to the characteristics and contents of the verification object according to the keyword corresponding to the characteristics and contents of the verification object; and
    binding and storing the verification object, the keyword and the identifier coordinates in the verification object storage unit.

4. The method according to claim 3, wherein the identifier coordinate comprises: a start point coordinate of the identifier, marker type, a start point coordinate of the marker, an end point coordinate of the marker and an end point coordinate of the identifier.

5. The method according to claim 3, further comprising a control step for constituting a second verification object by combining a keyword object;
wherein the keyword object is a video, an audio, an animation, a character, a text, a dynamic picture, a static picture or a combination thereof containing the keyword; the identifier coordinates of the keyword object are set according to the keyword; the keyword object, the keyword and the identifier coordinates of the keyword object are bound, and then stored in the verification object storage unit;
the keyword object is extracted from the verification object storage unit, then transmitted to the client device; the keyword object is played and displayed on a surface or an adjacent location of the verification object or played as a background of the verification object, the second verification object is constituted by combining the verification object and the keyword object; a keyword corresponding to the second verification object and identifier coordinates of the second verification object are determined by the keyword bound by the keyword object and the identifier coordinates of the keyword object;
alternatively, the keyword object is directly generated according to the keyword corresponding to the characteristics and contents of the verification object and displayed and played on the client device;
alternatively, the keyword object is directly generated according to the keyword corresponding to the characteristics and contents of the verification object and played and displayed on the surface or the adjacent location of the verification object or played as the background of the verification object.

6. A device for implementing the verification method for data access, comprising:
a server computer system comprising processors and a storage unit; an acquisition module, configured to acquire keywords corresponding to characteristics and contents of verification objects displayed and played by a client device; wherein the verification objects are video, audio, animation, characters, text, dynamic pictures, static pictures, or combinations thereof;
a marking module, configured to mark the characteristics and contents with identifier, and further generate a verification prompt according to relationship of the keyword and the identifier; wherein the identifier is a letter, a number, a symbol or a picture;
a second receiving module, configured to receive a second request for requesting a verification from the client device; wherein the second request carries a second verification code that is filled in or selected from selection items by the client device according to the verification prompt;
a second determining module, configured to acquire a first verification code associated with the keyword, the identifier and the verification prompt according to the second request; and
a second judging module, configured to determine a verification result according to the first verification code and the second verification code;
wherein the acquisition module, the marking module, the second receiving module, the second determining module and the second judging module are stored in the storage unit and operated by the processors.

7. The device of claim 6, wherein, before acquiring the keyword corresponding to the characteristics and contents of a verification object of the verification objects displayed and played on a client device, the device further comprises:
a first receiving module, configured to receive a first request sent by the client device for requesting the verification; wherein the first request carries related information disclosed by the client device; the related information comprises: verification display, position and area for displaying, the verification object, user disclosure information, user IP address, geographic location information, user gender, age and interest preferences and forum or website incentives for passing the verification of the user;
a first determining module, configured to select the verification object from a verification object storage unit according to the first request;
a sending module, configured to send the verification object to the client device;
wherein the first receiving module, the first determining module and the seconding module are stored in the storage unit and operated by the processors.

8. The device of claim 7, further comprising: a verification object storage module configured to provide a verification object storage unit; wherein the verification object storage unit is configured to store the verification object, the keyword and an identifier coordinates; wherein the verification object is acquired from a local or network storage server, or through directly uploading; the identifier coordinate corresponding to the characteristics and contents of the verification object is set according to the keyword corresponding to the characteristics and contents of the verification object; the verification object, the keyword and the identifier coordinates are bound before being stored in the verification object storage unit;
wherein the verification object storage module is stored in the storage unit and operated by the processors.

9. The device of claim 8, further comprising: a coordinate module configured to set the identifier coordinates; wherein the identifier coordinate comprises: a start point coordinate of the identifier, marker type, a start point coordinate of the marker, an end point coordinate of the marker and an end point coordinate of the identifier;
wherein the coordinate module is stored in the storage unit and operated by the processors.

10. The device of claim 8, further comprising:
a control module configured to constitute a second verification object by combining a keyword object; wherein the keyword object is a video, an audio, an animation, a character, a text, a dynamic picture, a static picture or a combination thereof containing the keyword; the identifier coordinates of the keyword object are set according to the keyword; the keyword object, the keyword and the identifier coordinates of the keyword object are bound, and then stored in the verification object storage unit;
the keyword object is extracted from the verification object storage unit, then transmitted to the client device; the keyword object is played and displayed on a surface or an adjacent location of the verification object or played as a background of the verification object, the second verification object is constituted by combining the verification object and the keyword object; a keyword corresponding to the second verification object and identifier coordinates of the second verification object are determined by the keyword bound by the keyword object and the identifier coordinates of the keyword object;

alternatively, the keyword object is directly generated according to the keyword corresponding to the characteristics and contents of the verification object and displayed and played on the client device;

alternatively, the keyword object is directly generated according to the keyword corresponding to the characteristics and contents of the verification object and played and displayed on the surface or the adjacent location of the verification object or played as the background of the verification object;

wherein the control module is stored in the storage unit and operated by the processors.

* * * * *